United States Patent
Ding et al.

(10) Patent No.: US 10,652,464 B2
(45) Date of Patent: May 12, 2020

(54) SYSTEMS AND METHODS FOR AUTOMATICALLY SWITCHING A SURVEILLANCE CAMERA INTO AN AUTO CORRIDOR MODE

(71) Applicant: Honeywell International Inc., Morristown, NJ (US)

(72) Inventors: ZhongWei Ding, Shanghai (CN); JunWei Geng, Shanghai (CN); Bin Ye, Shanghai (CN)

(73) Assignee: Honeywell International Inc., Morris Plains, NJ (US)

( * ) Notice: Subject to any disclaimer, the term of this patent is extended or adjusted under 35 U.S.C. 154(b) by 44 days.

(21) Appl. No.: 15/664,290

(22) Filed: Jul. 31, 2017

(65) Prior Publication Data
US 2019/0037139 A1   Jan. 31, 2019

(51) Int. Cl.
*H04N 5/232*     (2006.01)
*H04N 7/18*      (2006.01)
(Continued)

(52) U.S. Cl.
CPC ....... *H04N 5/23245* (2013.01); *H04N 5/2252* (2013.01); *H04N 5/2253* (2013.01);
(Continued)

(58) Field of Classification Search
CPC ............. H04N 5/23245; H04N 5/2252; H04N 5/2253; H04N 5/23229; H04N 7/183
See application file for complete search history.

(56) References Cited

U.S. PATENT DOCUMENTS 5,481,479 A * 1/1996 Wight ................... G03B 37/02
                                                 348/144
5,969,760 A * 10/1999 Ernest ..................... G02B 7/28
                                                 348/219.1
(Continued)

FOREIGN PATENT DOCUMENTS

FR    2 789 253 A1    8/2000
JP    2017-92768 A    5/2017

OTHER PUBLICATIONS

Extended European search report for corresponding EP patent application 18177164.3, dated Aug. 1, 2018.
(Continued)

*Primary Examiner* — Chikaodili E Anyikire
(74) *Attorney, Agent, or Firm* — Seager Tufte & Wickhem LLP

(57) ABSTRACT

A camera can include a box housing, a rotatable mechanical mechanism carried within the box housing, and a sensor board carried by the rotatable mechanical mechanism. The rotatable mechanical mechanism can rotate the sensor board from a first orientation to a second orientation to switch the camera from operating in a normal mode to operating in a corridor mode. Additionally or alternatively, the camera can include a CMOS sensor and an accelerometer sensor carried by the sensor board and firmware carried by the box housing. The firmware can identify a first direction of the CMOS sensor, receive a signal from the accelerometer sensor identifying a second direction of gravity, compare the first direction and the second direction, and, responsive thereto, rotate an image captured by the camera to switch the camera from operating in the normal mode to operating in the corridor mode.

16 Claims, 4 Drawing Sheets

Normal Mode

(51) Int. Cl.
*H04N 5/225* (2006.01)
*G08B 13/196* (2006.01)

(52) U.S. Cl.
CPC ....... *H04N 5/2259* (2013.01); *H04N 5/23229* (2013.01); *H04N 7/183* (2013.01); *G08B 13/1963* (2013.01); *G08B 13/19632* (2013.01)

(56) References Cited

U.S. PATENT DOCUMENTS

| | | | | |
|---|---|---|---|---|
| 6,686,954 | B1 * | 2/2004 | Kitaguchi | H04N 5/2253 348/208.1 |
| 6,727,954 | B1 * | 4/2004 | Okada | G03B 13/00 318/282 |
| 6,757,008 | B1 * | 6/2004 | Smith | H04N 5/225 348/143 |
| 7,037,258 | B2 | 5/2006 | Chatenever et al. | |
| 8,743,219 | B1 | 6/2014 | Bledsoe | |
| 8,970,761 | B2 | 3/2015 | Anderson | |
| 2005/0286888 | A1 | 12/2005 | Konttinen | |
| 2006/0023084 | A1 * | 2/2006 | Fukuda | G11B 27/031 348/231.99 |
| 2006/0082657 | A1 * | 4/2006 | Meier | H04N 5/2253 348/208.7 |
| 2015/0015703 | A1 * | 1/2015 | LaFemina | F21V 33/0076 348/143 |
| 2016/0094764 | A1 * | 3/2016 | Martin | G01P 15/00 348/208.2 |
| 2018/0367739 | A1 * | 12/2018 | Messely | H04N 5/23299 |

OTHER PUBLICATIONS

English-language translation of FR patent application publication 2 789 253, published Aug. 4, 2000.
English-language translation of JP patent application publication 2017-92768, published May 25, 2017.

\* cited by examiner

Normal Mode

Corridor Mode

SYSTEMS AND METHODS FOR AUTOMATICALLY SWITCHING A SURVEILLANCE CAMERA INTO AN AUTO CORRIDOR MODE

FIELD

The present invention relates generally to surveillance cameras. More particularly, the present invention relates to systems and methods for automatically switching a surveillance camera into an auto corridor mode.

BACKGROUND

When a surveillance camera of a video surveillance system captures an image of a corridor in a building or a venue while the surveillance camera is operating in a normal mode, there is a common requirement that the aspect ratio of the image is 16:9 or 4:3. For example, FIG. 1 is an image 100 of a corridor captured by the surveillance camera operating in the normal mode. CMOS/CCD sensors in the surveillance camera can determine the ratio.

However, when the corridor is long and narrow, as seen in FIG. 1, the 16:9 or 4:3 ratio is wasteful. To achieve a larger field of view of the corridor, many surveillance cameras include a corridor mode that requires a user to rotate the box housing of the surveillance camera 90° and configure the rotational settings of the surveillance camera so that the aspect ratio of the image captured by the surveillance camera is 9:16 or 3:4. For example, FIG. 2 is an image 200 of the corridor captured by the surveillance camera operating in the corridor mode.

While the larger field of view of the corridor is advantageous, known surveillance cameras with the corridor mode include at last two disadvantages. First, although a straight bracket 300 can support the box housing 310 of the surveillance camera 320 mounted to a ceiling or a wall in the normal mode, as seen in FIG. 3, since the mounting holes of the box housing 310 are located on the top or bottom thereof, a right angle bracket 400 is required to support the box housing 310 mounted to the ceiling or the wall when manually rotated into the corridor mode, as seen in FIG. 4. However, the right angle bracket 400 supporting the rotated surveillance camera 420 is not strong and has a strange visual appearance. Second, after a user manually rotates the box housing 310, the user must also manually configure the rotational settings of the rotated surveillance camera 420.

In view of the above, there is a continuing, ongoing need for improved systems and methods.

DETAILED DESCRIPTION

Figure 1:
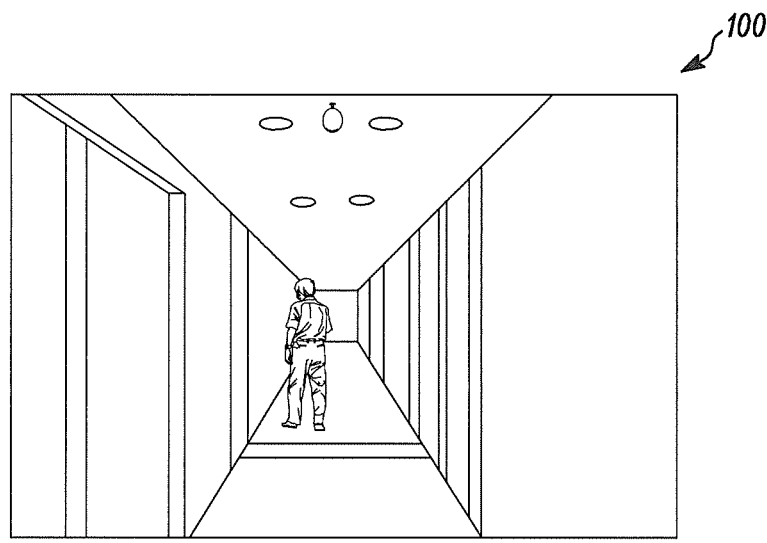
FIG. 1 is an image of a corridor captured by a surveillance camera operating in a normal mode.
Figure 2:
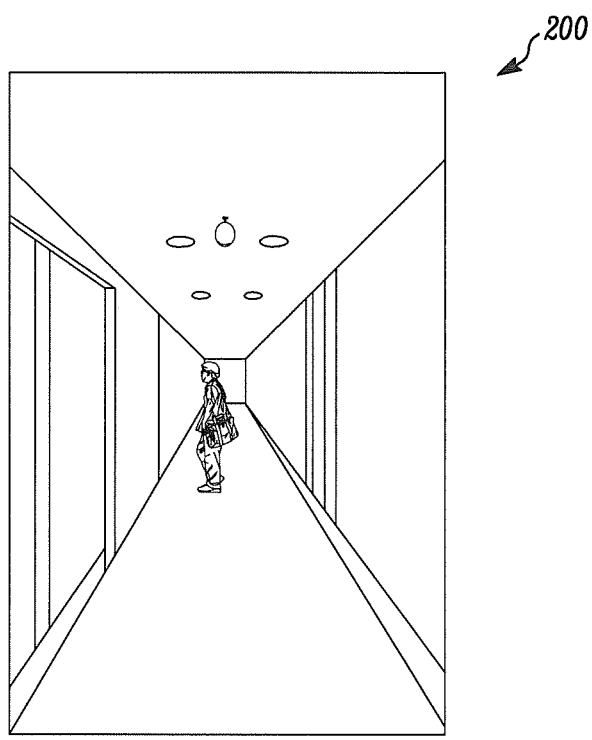
FIG. 2 is an image of a corridor captured by a surveillance camera operating in a corridor mode.
Figure 3:
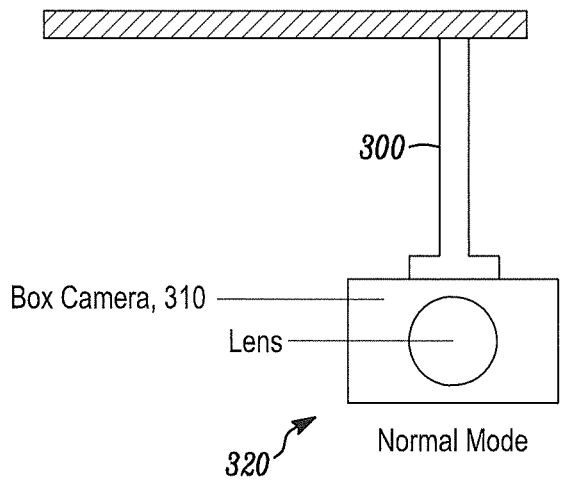
FIG. 3 is a block diagram of a straight bracket supporting a surveillance camera operating in a normal mode known in the art.
Figure 4:
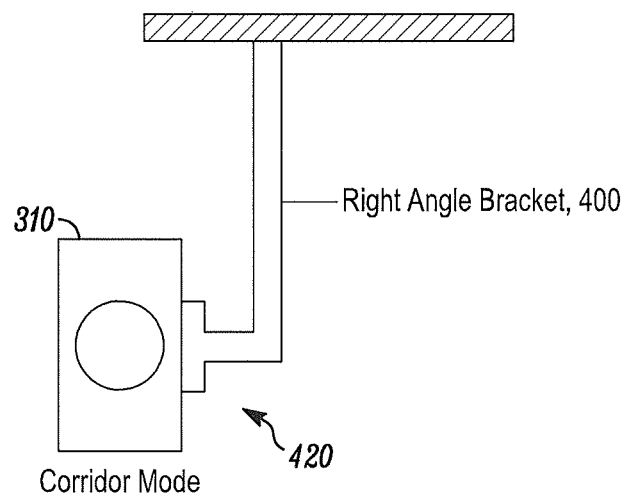
FIG. 4 is a block diagram of a right angle bracket supporting a surveillance camera operating in a corridor mode known in the art.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein can include systems and methods for automatically switching a surveillance camera into an auto corridor mode. In accordance with disclosed embodiments, the surveillance camera disclosed and described herein can include a box housing, and a rotatable mechanical mechanism and on-board accelerometer sensor carried within the box housing can facilitate the surveillance camera manually or automatically switching into the auto corridor mode.

In some embodiments, when the surveillance camera functions in the normal mode, the aspect ratio of an image captured by the surveillance camera can be approximately 16:9 or 4:3, and when the surveillance camera functions in the auto corridor mode, the aspect ratio of the image capture by the surveillance camera can be approximately 9:16 or 3:4. However, it is to be understood that embodiments disclosed herein are not so limited. Rather, it is to be understood that the aspect ratio of the image captured by the surveillance camera functioning in the auto corridor mode can be an inverse of the aspect ratio of the image captured by the surveillance camera functioning in the normal mode.

It is to further be understood that systems and methods disclosed herein are described in connection with surveillance cameras that include a box housing. Accordingly, dome cameras do not come within the spirit and scope of the embodiments disclosed herein.

Figure 5:
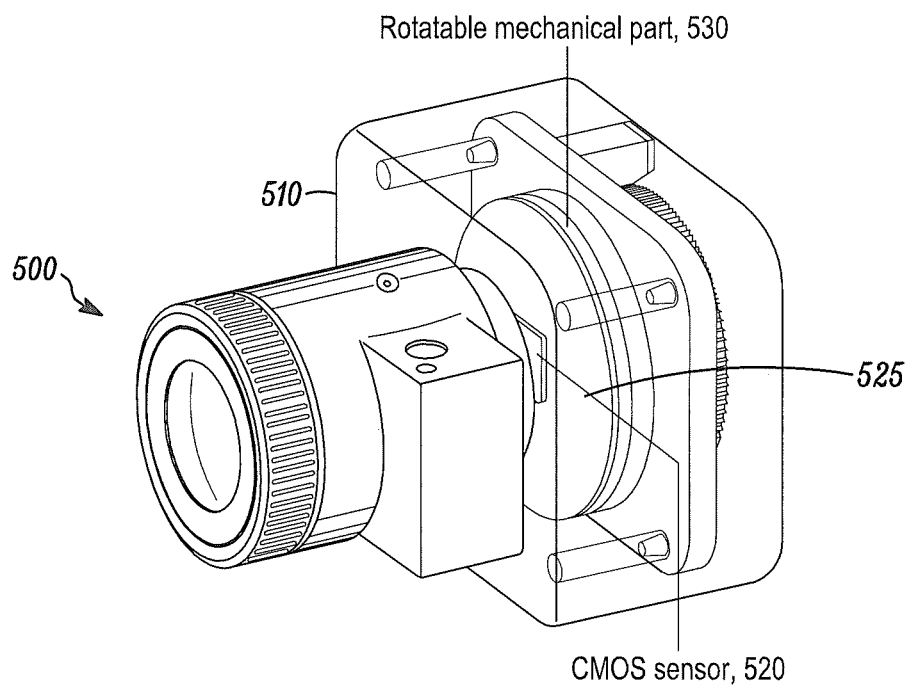
FIG. 5 is a front perspective view of a surveillance camera in accordance with disclosed embodiments with the box housing shown in phantom.
Figure 6:
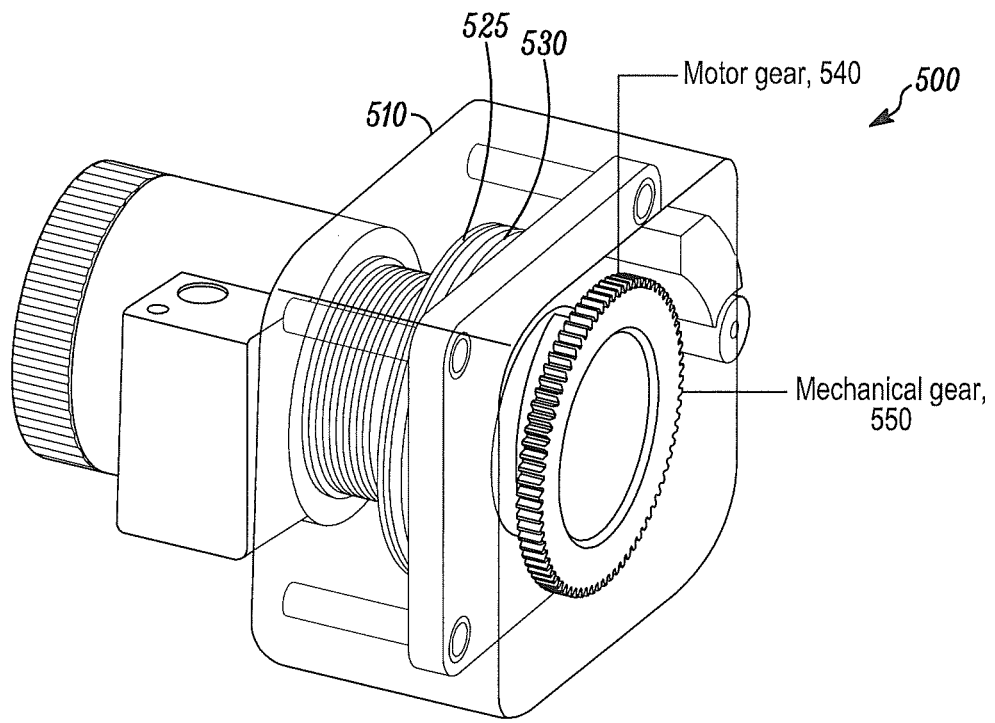
FIG. 6 is a back perspective view of a surveillance camera in accordance with disclosed embodiments with the box housing shown in phantom.

FIG. 5 is a front perspective view of a surveillance camera 500 in accordance with disclosed embodiments with the box housing 510 shown in phantom, and FIG. 6 is a back perspective view of the surveillance camera 500 in accordance with disclosed embodiments with the box housing 510 shown in phantom. As seen, a CMOS sensor 520 can be carried by a sensor board 525 inside of the box housing 510 of the surveillance camera 500, and the sensor board 525 can be carried by a rotatable mechanical mechanism 530 that can also be carried inside of the box housing 510. A motor driver, including a motor gear 540 and a mechanical gear 550, carried inside of the box housing 510 can cause the rotatable mechanical mechanism 530 to rotate, which can cause the sensor board 525 and, thus, the CMOS sensor 520 to rotate to switch the surveillance camera 500 from the normal mode to the auto corridor mode. Because only the internal components of the surveillance camera 500 rotate, and not the whole box housing 510, a straight bracket can be used to support the box housing 510 mounted to a ceiling or a wall regardless of whether the surveillance camera 500 is in the normal mode or the auto corridor mode.

Internal components of the surveillance camera 500, including the CMOS sensor 520, the sensor board, the rotatable mechanical mechanism 530, the motor gear 540, and the mechanical gear 550, can rotate manually or automatically. For example, in some embodiments, executable control software stored on a non-transitory computer readable medium of the surveillance camera 500 can cause firmware or control circuitry of the surveillance camera 500 to transmit a signal instructing the internal components to automatically rotate 90° to switch the surveillance camera 500 from the normal mode to the auto corridor mode. Additionally or alternatively, in some embodiments, a transceiver device of the surveillance camera 500 can receive a signal instructing the internal components to automatically rotate 90° to switch the surveillance camera 500 from the normal mode to the auto corridor mode. Additionally or alternatively, in some embodiments, the box housing 510 can carry a user interface device, such as an auto corridor mode button, on an exterior thereof, and when depressed by a user, firmware or control circuitry of the surveillance camera 500 can control the internal components manually or automatically rotating 90° to switch the surveillance camera 600 from the normal mode to the auto corridor mode.

Figure 7:
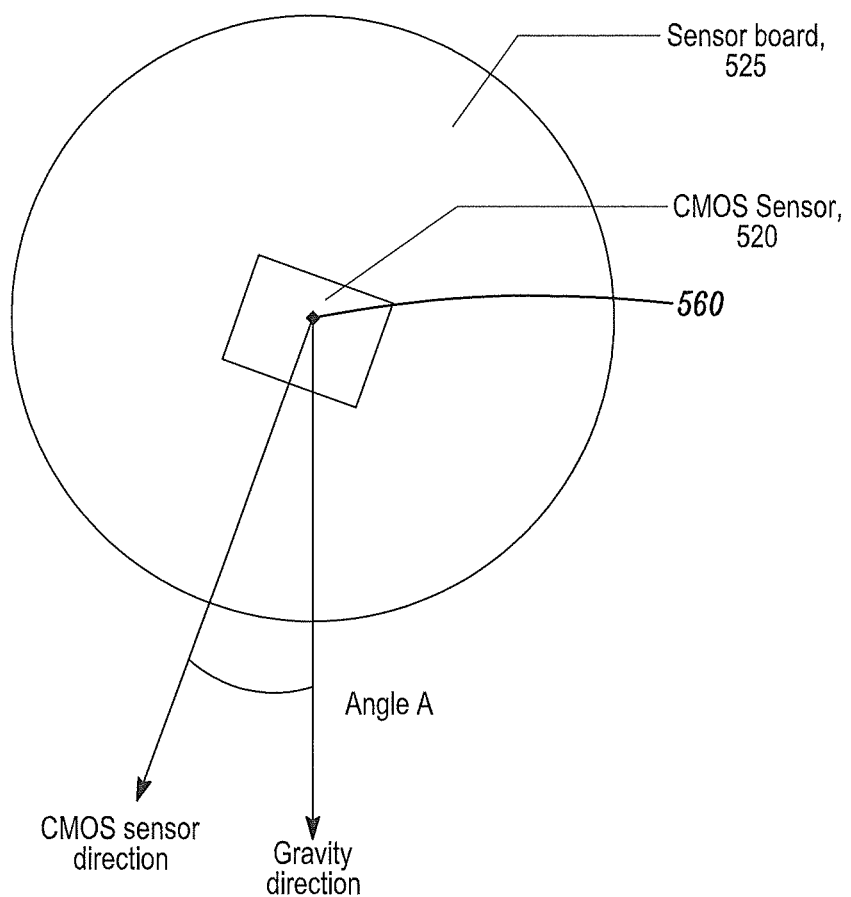
FIG. 7 is a front view of a sensor board in accordance with disclosed embodiments.

FIG. 7 is a front view of the sensor board 525 in accordance with disclosed embodiments. As seen in FIG. 7, the sensor board 525 can carry both the CMOS sensor 520 and an accelerometer sensor 560 inside of the box housing 510 of the surveillance camera 500, and the accelerometer sensor 560 detect the direction of gravity. Because the sensor board 525 can rotate within the box housing 510, the direction of the CMOS sensor 520 can also rotate. Firmware or control circuitry of the surveillance camera 500 can identify the direction of the CMOS sensor 520 and receive a signal from the accelerometer sensor 560 that identifies the direction of gravity. Responsive thereto, the firmware or the control circuitry of the surveillance camera 500 can rotate an image or a video data stream captured by the surveillance camera 500 to automatically configure the rotational settings of the surveillance camera 500. For example, when the angle A between the direction of the CMOS sensor 520 and the direction of gravity is less than a predetermined angle, for example, 45° or 90°, then the surveillance camera 500 can function in a normal mode. However, when the angle A between the direction of the CMOS sensor 520 and the direction of gravity is greater than the predetermined angle, for example, 45° or 90°, then the surveillance camera 500 can automatically switch from the normal mode to the auto corridor mode, thereby avoiding a user manually configuring the rotational settings of the surveillance camera 500.

Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A non-domed surveillance camera comprising:
   a box housing;
   an image sensor having an aspect ratio that is other than 1:1;
   a rotatable mechanical mechanism carried within the box housing for rotating the image sensor relative to the box housing about a single rotation axis between a normal mode and a corridor mode;
   a motor for rotating the rotatable mechanical mechanism;
   a receiver configured to receive an instruction from a remote device that when executed causes the non-domed surveillance camera to switch between the normal mode and the corridor mode;
   control circuitry operatively coupled to the motor and the receiver; and
   wherein the instruction, when received from the remote device and executed by the control circuitry, instructs the control circuitry to activate the motor to rotate the rotatable mechanical mechanism from a first orientation to a second orientation sufficient to switch the surveillance camera between the normal mode and the corridor mode.

2. The non-domed surveillance camera as in claim 1 wherein the aspect ratio of the image sensor includes a first aspect ratio of a first image captured by the non-domed surveillance camera operating in the corridor mode and a second aspect ratio of a second image captured by the non-domed surveillance camera operating in the normal mode that is an inverse of the first aspect ratio.

3. The non-domed surveillance camera as in claim 2 wherein the first aspect ratio is 9:16, and wherein the second aspect ratio is 16:9.

4. The non-domed surveillance camera as in claim 1 wherein the image sensor comprises a CMOS sensor carried by a sensor board.

5. The non-domed surveillance camera as in claim 4 further comprising:
   an accelerometer sensor carried by the sensor board;
   wherein the control circuitry is configured to identify a first direction of the CMOS sensor,
   wherein the control circuitry is configured to receive a signal from the accelerometer sensor identifying a second direction of gravity, and
   wherein the control circuitry is configured to compare the first direction and the second direction and, responsive thereto, rotate the sensor board.

6. The non-domed surveillance camera as in claim 5 wherein the control circuitry is configured to rotate the sensor board when a first angle between the first direction and the second direction is greater than a predetermined angle.

7. The non-domed surveillance camera as in claim 5 wherein the control circuitry is configured to rotate the sensor board 90°.

8. The non-domed surveillance camera as in claim 1 further comprising a motor gear and a mechanical gear.

9. The non-domed surveillance camera as in claim 1 wherein the box housing remains stationary when the non-domed surveillance camera switches from operating in the normal mode to operating in the corridor mode.

10. The non-domed surveillance camera as in claim 1 further comprising a straight bracket supporting the box housing mounted to a ceiling or a wall when the non-domed surveillance camera is operating in the normal mode and when the non-domed surveillance camera is operating in the corridor mode.

11. The non-domed surveillance camera as in claim 1 further comprising a user interface device carried by the box housing, wherein the user interface device receives user input instructing the control circuitry to drive the motor to rotate the rotatable mechanical mechanism from the first orientation to the second orientation.

12. The non-domed surveillance camera as in claim 1 wherein the first orientation is perpendicular to the second orientation.

13. A non-domed surveillance camera comprising:
   a box housing;
   a CMOS sensor carried within the box housing and having an aspect ratio that is other than 1:1;
   a rotatable mechanical mechanism carried within the box housing for rotating the CMOS sensor about a single rotation axis between a normal mode and a corridor mode;
   an accelerometer sensor carried within the box housing; and
   firmware carried by the box housing,
   wherein the firmware identifies a first direction of the CMOS sensor,
   wherein the firmware receives a first signal from the accelerometer sensor identifying a second direction of gravity, and
   wherein the firmware has an auto corridor mode, and when the firmware is placed in the auto corridor mode, the firmware is configured to:
      compare the first direction and the second direction to determine an angle between the first direction and the second direction and when the angle is less than a predetermined angle, the firmware determines that the non-domed surveillance camera is operating in the normal mode and transmits a signal instructing the rotatable mechanical mechanism to automatically rotate the CMOS sensor relative to the box housing about the single rotation axis to switch the non-domed surveillance camera from operating in the normal mode to operating in the corridor mode, and when the angle is greater than the predetermined angle, the firmware determines that the non-domed surveillance camera is already operating in the corridor mode and does not transmit the signal instructing the rotatable mechanical mechanism to rotate the CMOS about the single rotation axis thereby keeping the non-domed surveillance camera in the corridor mode.

14. The non-domed surveillance camera as in claim 13 wherein switching the non-domed surveillance camera from operating in the normal mode to operating in the corridor mode inverts the aspect ratio of an image captured by the non-domed surveillance camera.

15. The non-domed surveillance camera as in claim 13 wherein the firmware transmits the signal instructing the rotatable mechanical mechanism to rotate the CMOS sensor 90°.

16. The non-domed surveillance camera of claim 13 further comprising:
   a sensor board carried by the rotatable mechanical mechanism,
   wherein the sensor board carries the CMOS sensor and the accelerometer sensor, and
   wherein the rotatable mechanical mechanism rotates the sensor board and thus the CMOS sensor.

* * * * *